Sept. 19, 1944.　　　　W. UHLIG　　　　2,358,609
SCAVENGING APPARATUS
Filed April 19, 1943　　　3 Sheets-Sheet 1
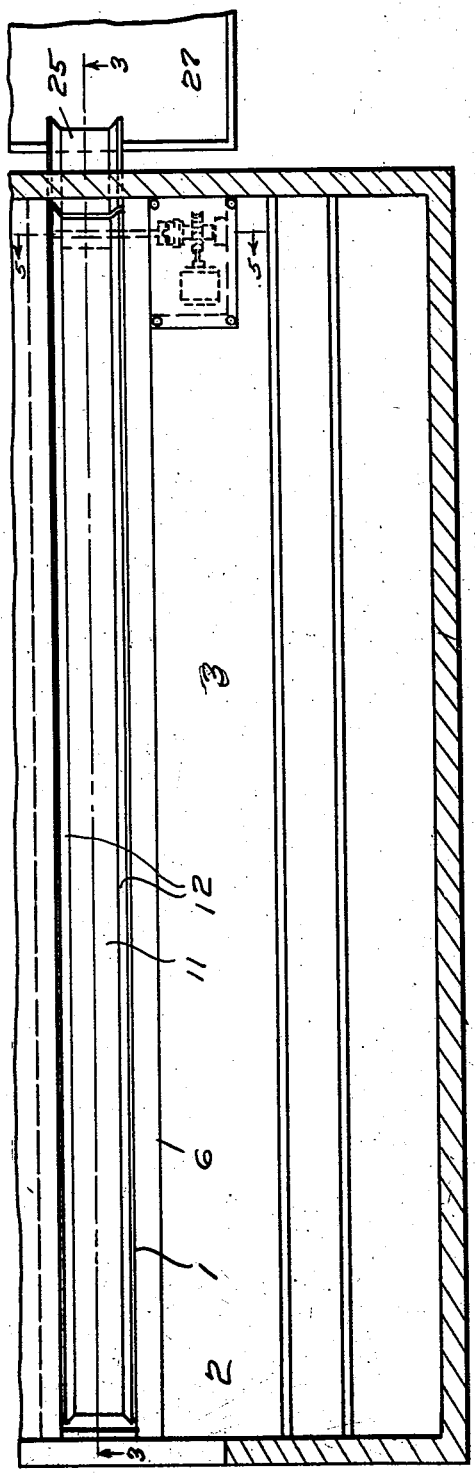
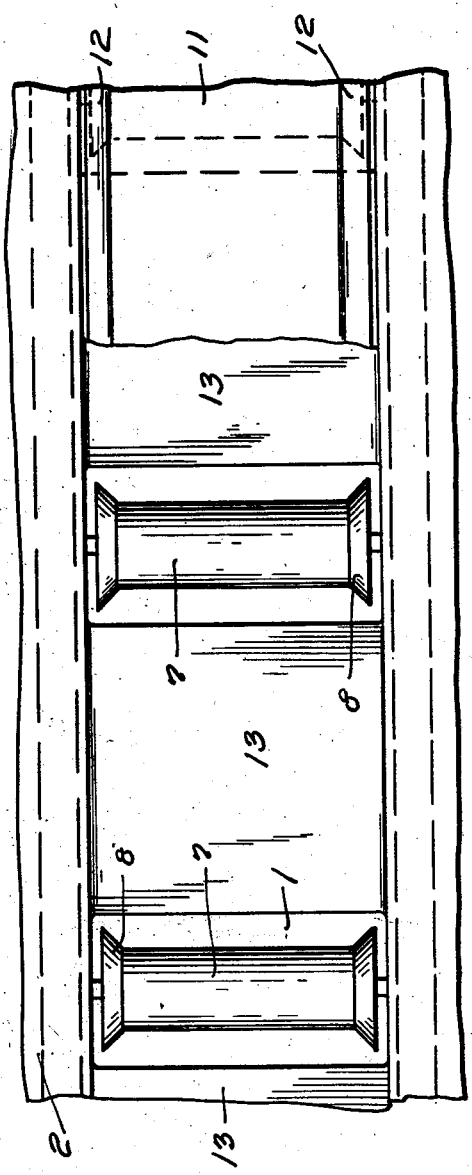
Inventor
Wallace Uhlig.
By Clarence A. O'Brien
and Harvey B. Jacobson
Attorneys Sept. 19, 1944. W. UHLIG 2,358,609
SCAVENGING APPARATUS
Filed April 19, 1943 3 Sheets-Sheet 2
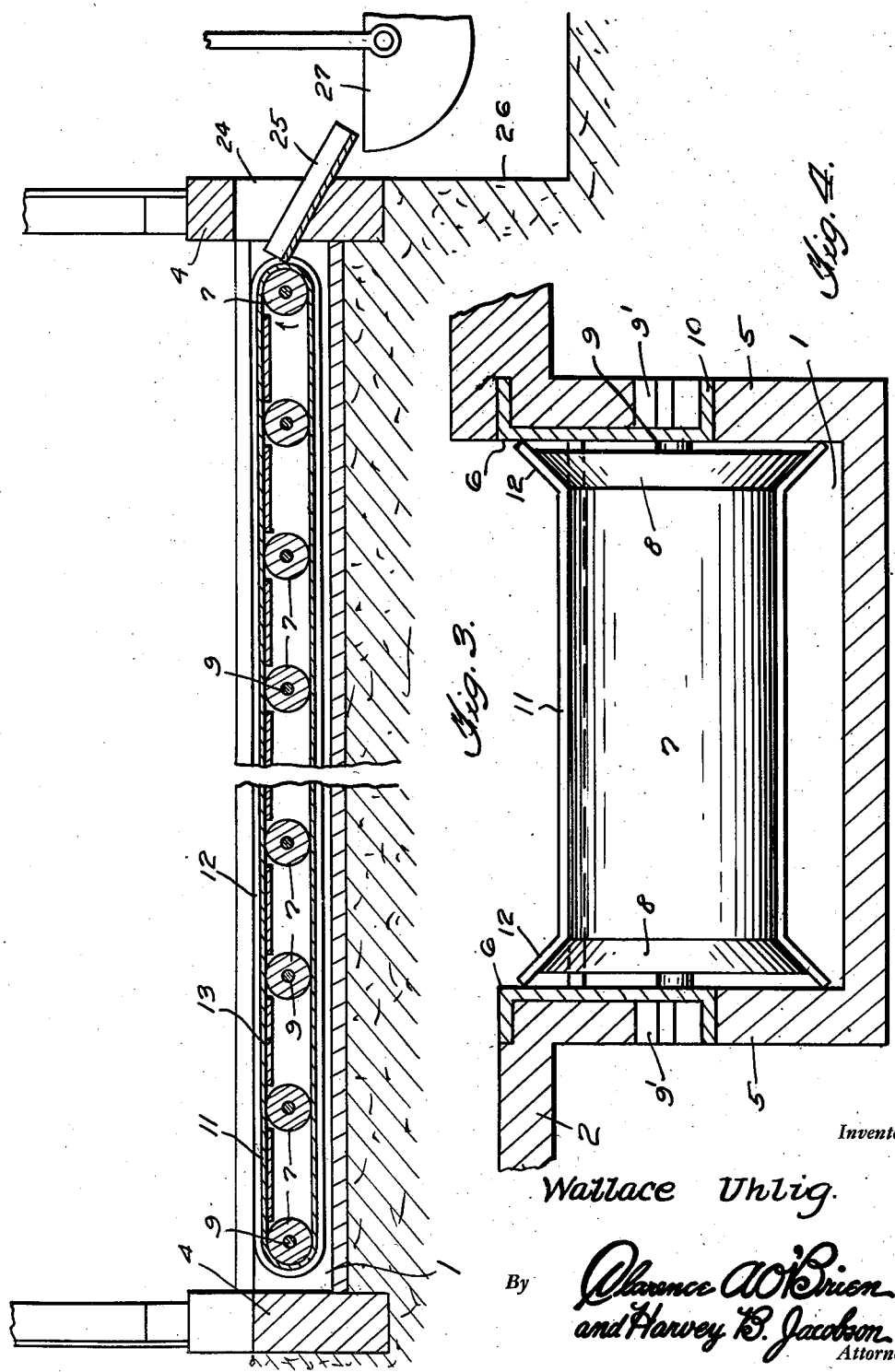

Sept. 19, 1944.   W. UHLIG   2,358,609
SCAVENGING APPARATUS
Filed April 19, 1943   3 Sheets-Sheet 3

Inventor
Wallace Uhlig.
By Clarence A. O'Brien
and Harvey B. Jacobson
Attorneys

Patented Sept. 19, 1944

2,358,609

UNITED STATES PATENT OFFICE 2,358,609

SCAVENGING APPARATUS

Wallace Uhlig, Fergus Falls, Minn.

Application April 19, 1943, Serial No. 483,641

1 Claim. (Cl. 198—65)

My invention relates to scavenging apparatus and more particularly to improvements in manure disposal equipment for stables.

The principal object of the invention is to provide inexpensive, simply constructed means for conveying manure, both solid and liquid, from behind the stalls more particularly of cow stables and which is especially adapted for easy installation and low cost upkeep and servicing.

Other and subordinate objects are also comprehended by my invention, all of which, together with the precise nature of my improvements, will be readily understood when the succeeding description and claim are read with reference to the drawings accompanying and forming part of this specification.

Figure 5:
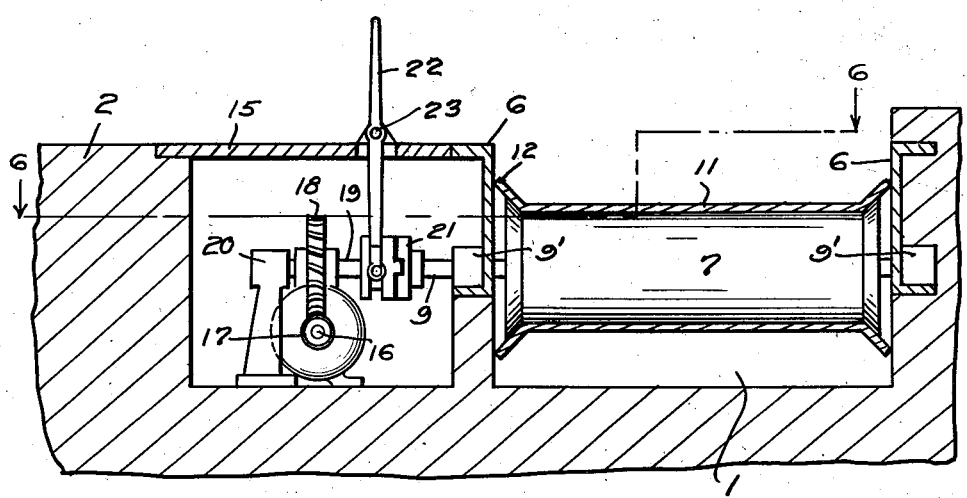
Figure 6:
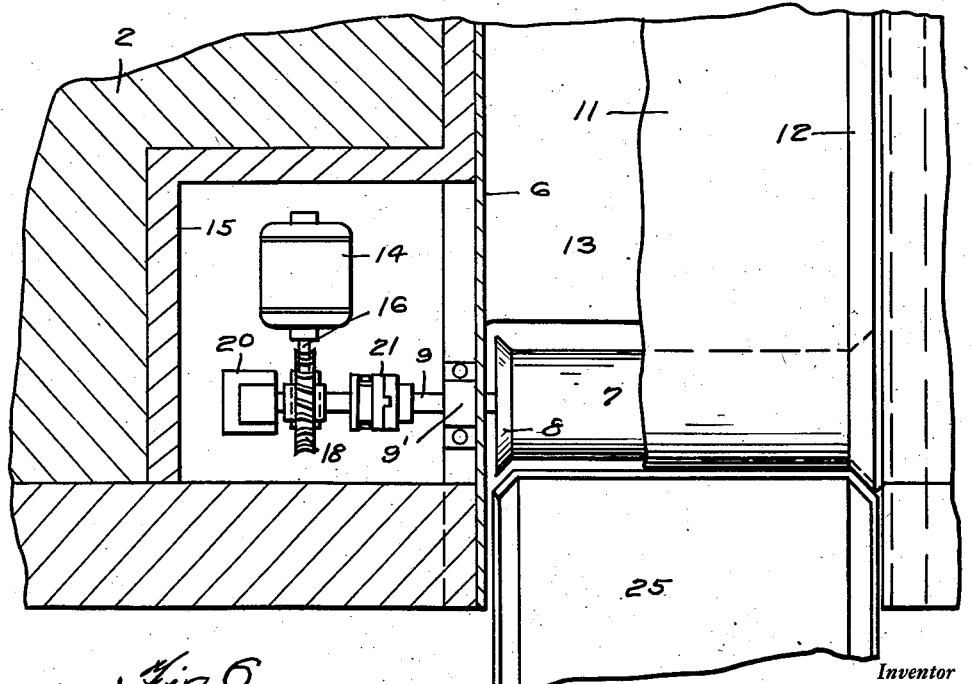

In said drawings:

Figure 1 is a view partly in horizontal section and partly in plan of a preferred embodiment of my invention installed, Figure 2 is a fragmentary view in top plan, with parts broken away, and drawn to an enlarged scale, Figure 3 is a view in longitudinal section taken on the line 3—3 of Figure 1 and drawn to an enlarged scale, Figure 4 is a view in transverse section taken on the line 4—4 of Figure 3 and drawn to a further enlarged scale, Figure 5 is a view in transverse section taken on the line 5—5 of Figure 1 and drawn to an enlarged scale, and Figure 6 is a view in horizontal section taken on the line 6—6 of Figure 5.

Referring to the drawings by numerals, according to my invention, in the illustrated embodiment thereof, a transversely rectangular trough 1 is formed in the concrete floor 2 of a stable in the rear of the stalls 3 to extend transversely of the stalls and intersect each stall at the floor level. Preferably the trough 1 extends from side to side of the stable between the side foundations 4 and is formed of concrete or cement as part of the floor 2. The side walls 5 of the trough 1 are reinforced for a suitable distance below the top of the trough by angle iron beams 6 extending longitudinally of said trough and set into said side walls 5 flush with the inner faces of the latter.

Extending transversely across the trough 1 is a series of rollers 7 equidistantly spaced longitudinally of the trough and below the top of the latter, said rollers having flared end flanges 8 and being rotatable on axial shafts 9, the ends of which are suitably arranged in bearings 9' set into the side walls 5 of the trough 1 preferably on the bottom flanges 10 of the beams 6. The end rollers of the series are arranged close to the side foundations 4 and one end roller is fast on its shaft 9 to be driven thereby through the medium of drive mechanism presently described.

An endless conveyor belt 11 is trained around the rollers 7 and which is provided with laterally inclined side edges 12 sliding on the flanges 8 of the rollers 7 and wipingly engaging the sides of the trough 1. Intermediate the rollers 7, the top run of the conveyor belt 11 is supported by horizontal plates 13 extending between the means 6 and suitably secured thereto.

The drive mechanism comprises a motor 14 suitably fixed in pit 15 formed in the floor 2 and adapted to be closed by a suitable cover plate 15. The armature shaft 16 of the motor 14 is provided with a worm 17 fast thereon and meshing with a worm wheel 18 fast on a motion transmitting shaft 19 having one end journaled in a suitable bearing 20. A suitable clutch 21 is provided for operatively connecting the other end of the shaft 19 to the shaft 9 of the beforementioned driven roller 7, said shaft 9 being extended into the pit 15, as best shown in Figure 5. A clutch shifting lever 22 extends upwardly out of the pit 15 through the plate 15' to which said lever is pivoted, as at 23. The clutch 21 may be of any suitable type and need merely be identified in passing.

The side foundations adjacent the described driven roller 7 is provided, opposite the latter, with a suitable aperture 24 therein for permitting manure to be discharged therethrough. A downwardly and outwardly inclined chute 25 is suitably fixed in said aperture to receive the manure from the conveyor belt 11. The chute 25 may discharge into a ditch 26 provided alongside the stable or into a suitable receptacle 27 for conveying a load to a remote location.

As will be understood, the described drive mechanism is designed to rotate the driven roller 7 in a direction, indicated by the arrow in Figure 3, such that the top run of the conveyor belt 11 travels toward the chute 25. The inclined edges, or flanges 12 of the conveyor belt 11 adapt the top run of said belt to function as a traveling tray of particular advantage in conveying manure, both solid and liquid, to the chute 25 without the spilling of such contents into the trough 1. By having the edges, or flanges, 12 wipingly engaging the beams 6, a seal is formed between the conveyor belt 11 and sides of the trough 1 obviating overflow from the conveyor belt into the trough 1 in a manner which will be clear. Preferably, the rollers 7, plates 13 and conveyor belt 11 are so arranged that the top run of said belt inclines slightly toward the chute 25 to drain into the latter so that when the conveyor belt 11 is stationary, liquid will be drained from the top run into the chute 25 to pass out of the latter.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

Scavenging apparatus for removing manure from a stable having a row of stalls and side walls, said apparatus comprising a trough countersunk in the floor of the stable and extending in the rear of the stalls transversely thereof, a conveyor in said trough extending longitudinally thereof and comprising an endless belt forming a top run for supporting manure thereon and provided with inclined side edge flanges wipingly engaging the side walls of the trough to prevent the escape of manure off said run into said trough, means to drive said conveyor to cause said run to travel toward one wall of the stable, and a discharge chute extending through said one wall and into which said top run discharges, said means comprising laterally spaced like end and intermediate rollers of the same length extending axially across said trough and having beveled end flanges for supporting said flanges, first mentioned, angle iron beams extending along the sides of the trough flush with said sides and opposite the side edges of the upper run of said conveyor, and metal plates connecting said beams and extending between said rollers substantially from roller to roller and supporting the upper run of the conveyor.

WALLACE UHLIG.